United States Patent [19]

Benjamin et al.

[11] 3,877,322

[45] Apr. 15, 1975

[54] INDEXER WITH DIAPHRAGM TYPE DISC BRAKE

[75] Inventors: Milton L. Benjamin, Chagrin Falls; David D. Walker, Solon, both of Ohio

[73] Assignee: Erickson Tool Company, Solon, Ohio

[22] Filed: July 1, 1974

[21] Appl. No.: 484,767

[52] U.S. Cl. .................. 74/823; 74/818; 74/824; 279/5
[51] Int. Cl. ............................................ B23b 29/32
[58] Field of Search ............. 74/824, 823, 826, 818; 279/5

[56] References Cited
UNITED STATES PATENTS

| | | | |
|---|---|---|---|
| 2,947,061 | 8/1960 | Carlsen et al. | 74/824 X |
| 3,718,055 | 2/1973 | Maier | 74/826 |
| 3,824,877 | 7/1974 | Mazue | 74/824 X |

Primary Examiner—Samuel Scott
Assistant Examiner—F. D. Shoemaker
Attorney, Agent, or Firm—Donnelly, Maky, Renner & Otto

[57] ABSTRACT

An indexer comprising a housing having an indexing spindle journalled therein in preloaded bearings and adapted to mount thereon a work holding chuck or fixture, the spindle having the radially inner portion of an axially flexible disc brake element or diaphragm affixed thereto, and the housing having a fluid pressure actuated ring non-rotatably but axially movable secured to the housing which axially flexes the radially outer portion of the disc into frictional engagement between the ring and said housing thus to securely lock the spindle in each of its indexed positions to prevent imposition of radial load on the spindle bearings and torque load on the locking pin of the indexing mechanism during the machining of a workpiece held by the chuck or fixture. The indexer herein is further characterized in the provision of a sealing ring in the chamber between preloaded spindle bearings, said sealing ring having an axial passage therethrough which intercommunicates the bearing chambers with a source of lubricant and having a radial passage for conducting fluid under pressure from the housing to the spindle for operation of a fluid pressure operated chuck on the spindle.

7 Claims, 3 Drawing Figures

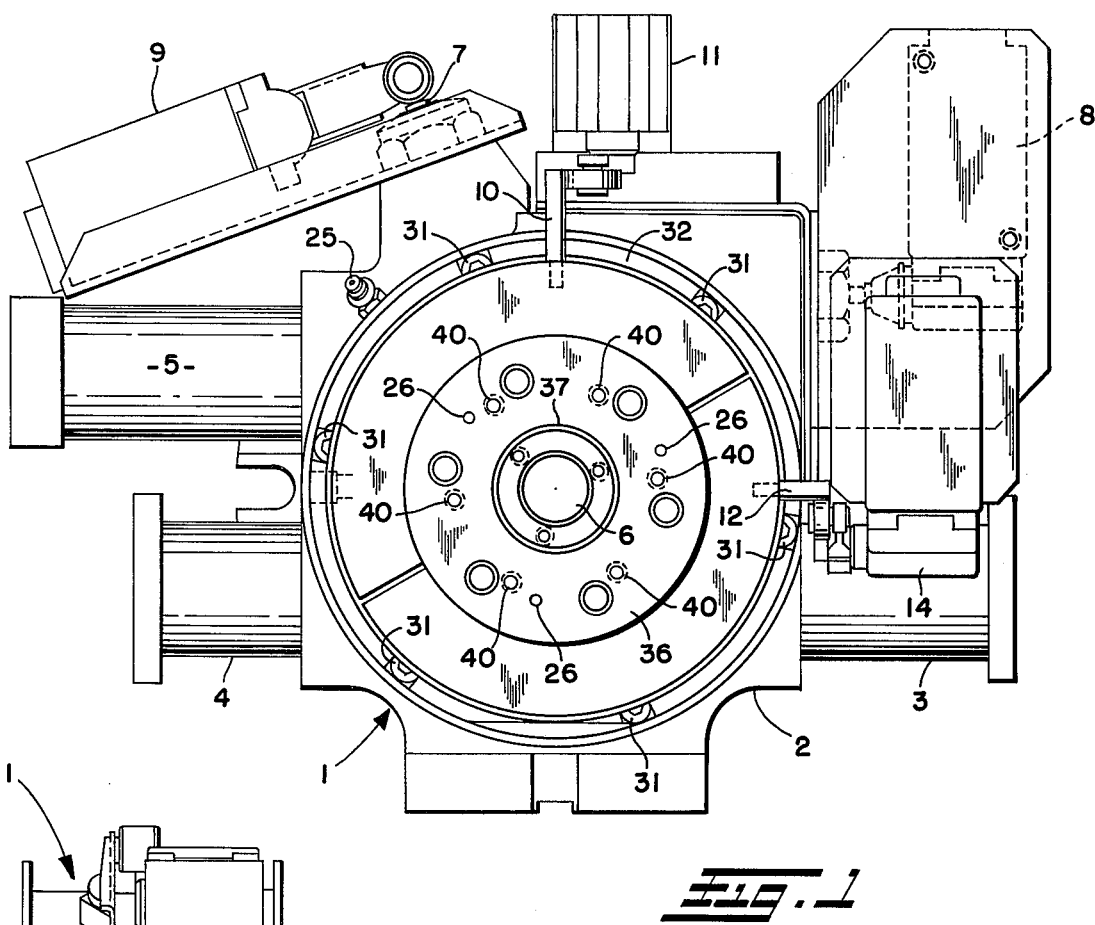
Fig. 1
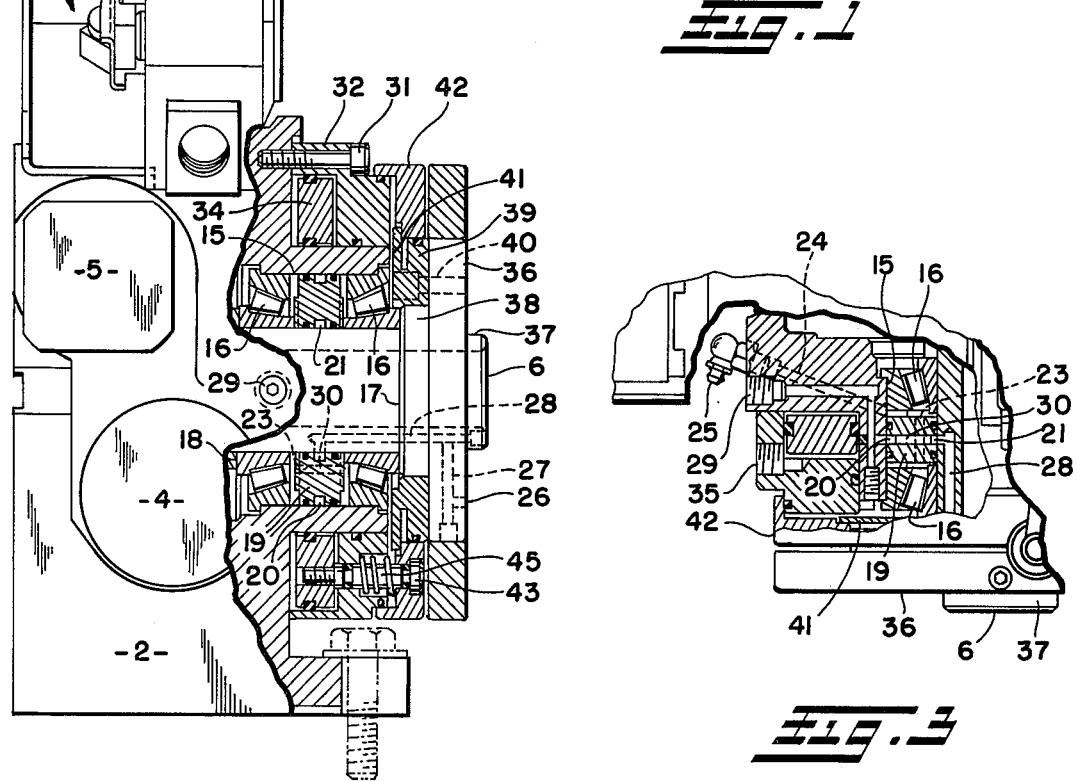
Fig. 2
Fig. 3

INDEXER WITH DIAPHRAGM TYPE DISC BRAKE

BACKGROUND OF THE INVENTION

It is known to provide an indexer having a housing embodying a fluid pressure actuated indexing mechanism which cooperates with a ratchet wheel on the indexing spindle to index the latter and having an index pin or locking pin which moves radially into engagement with selected tooth spaces of the ratchet wheel to hold the spindle in its respective indexed positions, the indexing spindle being journalled in the housing by preloaded bearings. For an example of that type of indexer, reference may be had to the Benjamin et al. U.S. Pat. No. 3,035,461 from which it is evident that a torque load on the spindle will impose a shearing load on the index pin and a radial load on the spindle will impose a radial load on the spindle bearings. Similar indexers are disclosed in the following U.S. Pat. Nos. 2,600,960; 2,754,700; 2,785,579; 2,883,866; and 3,406,596.

It is also known to provide in manual indexers a manually operated brake in which brake shoes are clamped against a cylindrical drum on the indexing spindle as for example disclosed in the U.S. Pat. No. 2,793,866 and 3,113,474.

SUMMARY OF THE INVENTION

The present invention relates to an indexer which embodies a disc-type brake to securely lock the indexing spindle in indexed position to prevent transmission of torque load on said spindle to the index pin and to prevent transmission of radial load on the spindle to the spindle bearings.

It is a principal object of this invention to provide an indexer with a disc-type brake as aforesaid in which the brake element is a laterally flexible annular diaphragm or disc which has its inner peripheral portion integrally secured to the spindle assembly and which is axially laterally flexed at its outer peripheral portion by a hydraulically actuated ring into frictional engagement between said ring and the indexer housing.

It is another object of this invention to provide an indexer having brake means as aforesaid in which the spindle bearings are preloaded and in which the lateral flexing of the disc brake element imposes an axial load on the spindle assembly to augment the preloading of the front bearing.

It is another object of this invention to provide a sealing ring in a chamber between the spindle and an indexer housing bore and between bearings which rotatably support the spindle in said housing with said ring having an axial passage for lubricating said bearings from a lubricant supply passage leading to a space between one bearing and said ring, and said ring further having a radial passage for communicating a fluid pressure supply passage in said housing with a passage in said spindle adapted to communicate with a fluid pressure operated chuck on said spindle.

Other objects and advantages will appear from the ensuing description.

BRIEF DESCRIPTION OF THE DRAWING

FIG. 1 is a front elevation view of an indexer embodying the present invention as viewed from the end of the spindle to which a chuck or work holding fixture is adapted to be mounted;

FIG. 2 is a side elevation view as viewed from the left-hand side of FIG. 1, said FIG. 2 being partly in section to illustrate in detail the preloaded bearing support for the indexing spindle and the disc brake and operating means therefor; and FIG. 3 is a fragmentary radial cross-section view illustrating the fluid pressure supply passages for actuating the disc brake and for actuating a chuck adapted to be mounted on the spindle and also illustrating a lubricant supply passage for lubricating the axially spaced apart preloaded spindle bearings.

DETAILED DESCRIPTION OF A PREFERRED EMBODIMENT

By way of illustrative example, the indexer 1 herein may be of the type disclosed in the aforementioned patents, particularly the Benjamin et al. U.S. Pat. No. 3,035,461, comprising a housing 2 having thereon a cocking cylinder 3, an indexing cylinder 4, and a cushioning cylinder 5.

As viewed in FIG. 1, when the piston in the cocking cylinder 3 is moved to the left, it will actuate a pawl carrying member in a clockwise direction for engagement of its pawl between selected teeth of a ratchet wheel which is non-rotatably secured on the indexing spindle 6. When the piston in the indexing cylinder 4 is actuated toward the right, the pawl carrying member will be rotated in a counterclockwise direction with such movement being cushioned by means associated with the cushioning cylinder 5 until the spring biased index pin 7 enters a predetermined tooth space in the ratchet wheel to lock the latter and the indexing spindle 6 in desired indexed position. As disclosed in said U.S. Pat. No. 3,035,461, the indexer housing 2 may be mounted on a reciprocating machine table and on the return stroke of the machine table, a switch may be closed thereby to energize one solenoid of a solenoid valve through a normally closed contacts in switch 8 for actuating the cocking cylinder 3 as aforesaid. The cocking stroke of the pawl carrying member will open the normally closed contacts of switch 8 and will close the normally open contacts of switch 8 to energize another solenoid of said valve to conduct fluid under pressure into the indexing cylinder 4 to cause the pawl carrying member to predeterminedly rotate the ratchet wheel and indexing spindle 6 through a predetermined angle. During the cocking and indexing strokes of the pawl carrying member, the index pin 7 is held by a cam on said member in its radially outer position to hold the normally closed switch 9 in open position and at the completion of the index cycle, said cam allows the index pin 7 to be spring biased radially inward into a desired tooth space with resulting closing of the normally closed switch 9 to complete a circuit to the machine to perform its machining operation on the work which is held in a chuck or by a fixture mounted on the end of the spindle 6. The pin 10 on the spindle 6 operates a cycle shutoff switch 11 and another pin 12 is appropriately placed to operate a skip index switch 14 as, for example, when it is desired to index the spindle 120° or 180° in two 60° or 90° steps. The indexer 1 will preferably be provided with a pushbutton switch or the like to complete the circuit to the machine control or tooling infeed and said pushbutton switch will preferably be wired in the electrical circuit so that index pin switch 9 must be closed before the machine operation can commence.

The housing 2 has a bore 15 to receive the outer races of oppositely disposed tapered roller bearings 16 which are preloaded between the spindle shoulder 17 and a nut actuated ring 18 on the spindle 6. In the chamber between the bearings 16 and between the spindle 6 and said bore 15 is a sealing ring 19 having external and internal O-rings or the like straddling outer and inner grooves 20 and 21 in said ring 19. Said sealing ring 19 has one or more axial passages 23 therethrough whereby lubricant is supplied to both bearings 16 from the lubricant supply passage 24 having a lubricant fitting 25 thereon as shown in FIG. 3.

For actuating a pneumatic or hydraulic chuck or the like which is adapted to be mounted on said spindle 6, the spindle 6 is provided with passages 26, 27, and 28 which communicate with the inner peripheral groove 21 of said sealing ring 19, and the housing 2 is provided with fluid pressure supply passage 29 which communicates with the external groove 20 of said sealing ring 19. The sealing ring 19 is provided with one or more radial passages 30 which intercommunicate the grooves 20 and 21 for supply of pressurized fluid from the housing passage 29 to the passages 26 leading to the chuck.

Secured to the indexer housing 2 as by the screws 31 is a cylinder block 32 which forms an annular cylinder chamber with the indexer housing 2 in which an annular piston 34 is actuated by admission of fluid under pressure through the port 35 in said cylinder block 32.

The spindle 6 has a flange 36 and extending in opposite directions therefrom are a chuck pilot portion 37 and a brake element pilot portion 38, the latter being adjacent the bearing preloading shoulder 17 aforesaid. The pilot 38 accurately locates the brake element 39 in coaxial relation to the spindle 6 and said brake element 39 is secured to the flange 36 as by screws 40. The brake element 39 is integrally formed with a laterally flexible brake portion 41, the outer peripheral portion of which is engaged by a brake applying ring 42 which is secured to the piston 34 by a series of uniformly spaced apart screws 43. When fluid under pressure is admitted into the cylinder 32 through the port 35, the annular piston 34 will be moved toward the left as viewed in FIG. 2 thereby moving the ring 42 to the left thus to flex the outer portion of diaphragm or disc 41 with respect to its inner peripheral portion into frictional engagement between the outer surface of the cylinder block 32 and the surface of the ring 42 which is engaged with the peripheral portion of the disc 41.

With the brake applied as aforesaid, torque load on the spindle 6 will not be transmitted to the index pin 7, and radial load on the spindle 6 will not be transmitted to the bearings 16. Moreover, it is noted that with the brake applied, the flexing of the diaphragm or disc 41 will tend to draw the spindle 6 to the left whereby the engagement of the shoulder 17 with the inner race of the front bearing 16 will enhance the initial preload to maintain the accurate positioning of the axis of the spindle 6.

When fluid pressure in the port 35 is released, the resilience of the disc or diaphragm 41 together with the force of the springs 45 around the screws 43 will return the piston 34 and 42 to the right to permit disengagement of the outer peripheral portion of the disc 41 with the end surface of the cylinder block 32 whereby the spindle 6 will be free for indexing movement to the next position.

As shown, the annular piston 34 will be provided with outer and inner O-rings or the like and the cylinder chamber may be sealed by an O-ring or the like in an internal groove in the cylinder block 32 in sealed engagement with said block 32 and with the outer cylindrical surface of the indexer housing 2. The remaining O-rings or the like are lubricant seals and further prevent dirt and foreign matter from reaching the bearings 16.

The embodiments of the invention in which an exclusive property or privilege is claimed are defined as follows:

1. In an indexer of the type wherein a housing has a spindle journalled in axially spaced apart bearings and operatively connected at one end to an indexing mechanism in said housing for imparting rotary indexing movement to said spindle about its longitudinal axis and to a workpiece adapted to be mounted on the other end of said spindle, the improvement which comprises an annular laterally flexible brake disc having an inner peripheral portion non-rotatably and axially fixedly secured in coaxial relation to said spindle and having an outer peripheral portion axially adjacent to an annular portion of said housing; and a fluid pressure actuated ring axially movable with respect to said spindle to engage the outer peripheral portion of said disc to laterally flex said disc to frictionally engage said outer peripheral portion with said housing thus to prevent transmission of spindle torque and radial loads to said indexing mechanism and bearings.

2. The indexer of claim 1 wherein said disc has its inner peripheral portion integrally secured to a ring portion which is secured by screw means to a flange on said spindle; said fluid pressure actuated ring being engaged with said outer peripheral portion in radially spaced relation to said inner peripheral portion.

3. The indexer of claim 2 wherein said fluid pressure actuated ring is axially slidable on the ring portion of said disc.

4. The indexer of claim 1 wherein a cylinder block is fixedly secured to said housing and defines therewith an annular cylinder chamber coaxially around said bearings; and wherein an annular piston in said chamber is actuated by fluid pressure and is operatively connected to said ring to axially move the latter thus to laterally flex said disc as aforesaid.

5. The indexer of claim 1 wherein said housing and said spindle define therebetween and between said bearings an annular chamber; and wherein an exteriorly and interiorly grooved sealing ring is disposed in said chamber in sealed engagement with the radially outer and inner walls thereof; said housing having a lubricant supply passage leading to said chamber between one bearing and said sealing ring; said housing further having a fluid pressure supply passage leading to the exterior groove of said sealing ring; said spindle having a passage leading to the interior groove of said sealing ring; said sealing ring having an axial passage therethrough for passage of lubricant to the other bearing and having a radial passage intercommunicating said grooves whereby fluid pressure in said housing passage is transmitted through said sealing ring to said spindle passage for actuating a fluid pressure actuated chuck or the like adapted to be mounted on said spindle.

6. The indexer of claim 1 wherein said bearings are preloaded; and wherein lateral flexing of the outer peripheral portion of said disc imposes an axial force on said inner peripheral portion thus to enhance such preloading while the outer peripheral portion is in frictional engagement with said housing.

7. The indexer of claim 5 wherein a cylinder block is fixedly secured to said housing and defines therewith an annular cylinder chamber coaxially around said bearings, said cylinder block having another fluid pressure supply passage leading into said cylinder chamber; and wherein an annular piston in said chamber is actuated by fluid pressure from said another passage and is operatively connected to said fluid pressure actuated ring to axially move the latter thus to laterally flex said disc as aforesaid.

* * * * *